United States Patent
Lenoble et al.

(10) Patent No.: US 12,037,493 B2
(45) Date of Patent: Jul. 16, 2024

(54) AQUEOUS EMULSION INCLUDING INTERPENETRATING NETWORK OF SILICONE GUM AND CROSSLINKED ORGANIC POLYMER

(71) Applicant: Dow Silicones Corporation, Midland, MI (US)

(72) Inventors: Bertrand Lenoble, Silly (BE); Nancy Delys, Silly (BE); Brett Zimmerman, Frankenmuth, MI (US); Joshua Katzenstein, Midland, MI (US); Yihan Liu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 176 days.

(21) Appl. No.: 17/765,286

(22) PCT Filed: Nov. 20, 2020

(86) PCT No.: PCT/US2020/061412
§ 371 (c)(1),
(2) Date: Mar. 30, 2022

(87) PCT Pub. No.: WO2021/133486
PCT Pub. Date: Jul. 1, 2021

(65) Prior Publication Data
US 2022/0348767 A1 Nov. 3, 2022

Related U.S. Application Data

(60) Provisional application No. 62/952,532, filed on Dec. 23, 2019.

(51) Int. Cl.
| | | |
|---|---|---|
| *C08L 83/04* | (2006.01) | |
| *C08F 220/18* | (2006.01) | |
| *C08F 220/40* | (2006.01) | |
| *C09D 7/40* | (2018.01) | |
| *C09D 7/65* | (2018.01) | |
| *C09D 175/04* | (2006.01) | |

(52) U.S. Cl.
CPC ........ *C08L 83/04* (2013.01); *C08F 220/1804* (2020.02); *C08F 220/40* (2013.01); *C09D 7/65* (2018.01); *C09D 7/69* (2018.01); *C09D 175/04* (2013.01); *C08L 2201/52* (2013.01); *C08L 2205/04* (2013.01); *C08L 2205/18* (2013.01)

(58) Field of Classification Search
None
See application file for complete search history.

(56) References Cited

U.S. PATENT DOCUMENTS

| | | |
|---|---|---|
| 3,930,921 A | 1/1976 | Connett |
| 5,356,706 A | 10/1994 | Shores |
| 5,539,021 A | 7/1996 | Pate et al. |
| 5,688,842 A | 11/1997 | Pate, III et al. |
| 6,013,682 A | 1/2000 | Dalle et al. |
| 6,074,747 A | 6/2000 | Scholz et al. |
| 6,353,051 B1 | 3/2002 | Huang |
| 6,353,076 B1 | 3/2002 | Barr et al. |
| 6,426,062 B1 | 7/2002 | Chopra et al. |
| 6,451,295 B1 | 9/2002 | Cai et al. |
| 6,783,766 B2 | 8/2004 | Pate et al. |
| 6,794,445 B2 | 9/2004 | Ruesmann et al. |
| 6,800,713 B2 | 10/2004 | Cook et al. |
| 7,232,859 B2 | 6/2007 | Argyropoulos et al. |
| 7,767,747 B2 | 8/2010 | Lind et al. |
| 8,591,999 B2 | 11/2013 | Lenoble et al. |
| 8,742,053 B2 | 6/2014 | Lange et al. |
| 8,877,293 B2 | 11/2014 | Evans et al. |
| 9,200,404 B2 | 12/2015 | Grzesiak et al. |
| 9,662,283 B2 | 5/2017 | Lemoine et al. |
| 9,863,012 B2 | 1/2018 | Watanabe |
| 10,100,377 B2 | 10/2018 | Eryazici et al. |
| 2003/0235553 A1 | 12/2003 | Lu et al. |
| 2004/0167252 A1 | 8/2004 | Melchiors et al. |
| 2005/0222368 A1 | 10/2005 | Reiners et al. |
| 2010/0160480 A1 | 6/2010 | Tomko et al. |
| 2010/0310882 A1 | 12/2010 | Ogawa et al. |
| 2011/0064688 A1 | 3/2011 | Jordan et al. |
| 2011/0112245 A1 | 5/2011 | Nakamura et al. |
| 2011/0150818 A1 | 6/2011 | Canfield et al. |
| 2012/0052939 A1 | 3/2012 | Utnick et al. |
| 2015/0010711 A1 | 1/2015 | James et al. |
| 2017/0204266 A1* | 7/2017 | Kennedy ................. C08L 83/12 |
| 2017/0247570 A1 | 8/2017 | Pirrung et al. |

FOREIGN PATENT DOCUMENTS

| | | |
|---|---|---|
| EP | 0315836 | 10/1987 |
| EP | 1536765 | 10/2007 |
| WO | 2011087767 | 7/2011 |
| WO | 2018115328 | 6/2018 |
| WO | 2019081277 | 5/2019 |
| WO | 2020081280 | 4/2020 |
| WO | 2020086545 | 4/2020 |

OTHER PUBLICATIONS

P. Pieterich, Aqueous Emulsion, Dispersion and Solutions of Polyurethanes; Synthesis and Properties in Progress in Organic Coatings 9 (1981) 281-340.

* cited by examiner

Primary Examiner — Robert T Butcher
(74) Attorney, Agent, or Firm — Edward W. Black

(57) ABSTRACT

An aqueous emulsion comprising particles having an average volume particle size (Dv 50) of 1 to 10 pm wherein the particles comprise an interpenetrating polymer network including from 90 to 99 wt % silicone gum and 1 to 10 wt % of crosslinked organic polymer, methods for making such aqueous emulsions, polyurethane coating compositions including such interpenetrating polymer networks, methods of preparing such polyurethane coating compositions, and their use in treating leather.

6 Claims, No Drawings

AQUEOUS EMULSION INCLUDING INTERPENETRATING NETWORK OF SILICONE GUM AND CROSSLINKED ORGANIC POLYMER

CROSS REFERENCE TO RELATED APPLICATIONS

This application claims the benefit of U.S. Provisional Patent Application Ser. No. 62/952,532 filed on Dec. 23, 2019 under 35 U.S.C. § 119 (e). U.S. Provisional Patent Application Ser. No. 62/952,532 is hereby incorporated by reference.

FIELD

The invention is directed toward aqueous silicone gum emulsions including methods for making and using the same. The subject emulsions find particular utility as additives for aqueous coating compositions suitable for treating leather, e.g. compositions including aqueous dispersions of polyurethane and silicone additives.

INTRODUCTION

Leather is often finished with one or more coatings in order to improve its overall performance. Such coatings are most commonly aqueous dispersions of polyurethane. Representative examples are described in: U.S. Pat. Nos. 3,930,921, 6,353,051, 6,794,445, 8,591,999, 9,200,404, U.S. Ser. No. 10/100,377, US2005/0222368 and US2010/0310882. Silicones are often included in such coating compositions to improve one or more of properties, e.g. haptics ("hand"), appearance, water repellency, abrasion resistance, breathability, etc.

In general, emulsions of silicone gums are particularly effective at improving haptic properties but due to their poor compatibility with polyurethane coating compositions, their use in leather treatment has been limited. This poor compatibility is at least partially attributed to the large particle size of such gum emulsions that are necessary to impart desired haptic properties. And while silicone emulsions (optionally including organic polymers) have been described for use other applications, e.g. inks, personal care, (see U.S. Pat. No. 7,767,747, US2011/0150818 and US2017/0247570), many of these types of non-gum emulsions have relatively small particle sizes (e.g. <1 um) making them poorly suited for use in improving haptic properties of leather coatings.

WO 2011/087767 describes emulsions comprising a blend of a silicone resin (rather than gum) formed via emulsion polymerization with an organic polymer for industrial coating applications. Such resin-based silicone emulsions have extremely poor haptics. Silicone-acrylic copolymers have also been described for use in leather treatment, e.g. see U.S. Pat. No. 9,863,012. While more compatible than their silicone counterparts, the required copolymerization is a complicated and expensive process. Emulsions comprising polymer blends of silicones and polyacrylates are also known for use in leather treatment, e.g. see WO2019/081277. In such emulsions, fully polymerized silicones (polyorganosiloxanes) and polyacrylates are combined in a common emulsion. Unfortunately, the two polymers are immiscible and separate over time (e.g. during storage) leading to a poor distribution of polymer particles upon application which results in defects (e.g. pin holes) in the final coating.

There continues to be a need for improved aqueous leather coating compositions that offer improved performance attributes (e.g. haptics and compatibility).

SUMMARY

The present invention includes aqueous emulsions including an interpenetrating polymer network (IPN) of silicone gum and a crosslinked organic polymer. As used herein, the term "interpenetrating polymer network" refers to a polymer comprising two or more networks which are at least partially interlaced on a molecular scale but not covalently bonded to each other and cannot be significantly separated unless chemical bonds are broken. That is, while unreacted monomers and partially polymerized oligomers may be extractable from the interlaced network, the individual polymer networks are non-separable from each other without cleaving chemical bonds. An IPN network is distinguishable from a simple polymer blend of two or more pre-formed polymer networks as described in WO2019/081277. In particular, the individual polymer networks of such non-IPN polymer blends may be separated without breaking chemical bonds and do indeed separate over time, e.g. during storage or during coating. This separation leads to a poor distribution of polymer particles upon coating of such blends, leading to defects such as pin holes. In contrast, the use of the subject IPN results in more homogeneous polymer particles wherein the individual polymer networks therein are restricted from migration. This results in a better distribution of polymers upon coating and a coating with fewer defects.

The invention includes multiple embodiments including: (i) an aqueous emulsion comprising particles having an average volume particle size (Dv 50) of 1 to 10 μm wherein the particles comprise an interpenetrating polymer network including from 90 to 99 wt % silicone gum and 1 to 10 wt % of crosslinked organic polymer, (ii) methods for making such aqueous emulsions, (iii) polyurethane coating compositions including such interpenetrating polymer networks, (iv) methods of preparing such polyurethane coating compositions, and (v) their use in treating leather.

DETAILED DESCRIPTION

Silicone Gum: As used herein, the term "silicone gum" refers to predominately linear polyorganopolysiloxanes substantially free of trifunctional T units ($RSiO_{3/2}$) and tetrafunctional Q units ($SiO_{4/2}$) and having sufficiently high molecular weight (Mw) to provide a viscosity greater than 10 MM centipoise (cP) at 25° C. and preferably at least 20 MM cP (e.g. from 20 MM to 100 MM cP) at 25° C. The weight average molecular weight (Mw) of such gums is preferred at least 400,000 Daltons, (e.g. from 400,000 to 1,000,000 Daltons and more preferably from 450,000 to 700,000 Daltons). The molecular structure is exemplified by straight-chain and partially branched straight-chain structures, with predominately linear systems being the preferred. Examples of applicable silicone gums along with methods for preparing the same are described in U.S. Pat. Nos. 6,013,682, 8,877,293 and US2015/0010711. While any organopolysiloxane considered as a gum may be selected, in one series of embodiments of the invention, the silicone gum is a diorganopolysiloxane (preferably dimethylpolysiloxane or "PDMS") gum with a molecular weight sufficient to impart a Williams plasticity number of at least about 30 (e.g. 30 to 250) and preferably 50 or higher as determined by ASTM D926-17. The silicon-bonded organic groups of the diorganopolysiloxane may independently be selected from hydrocarbon or halogenated hydrocarbon groups. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; and halogenated alkyl groups having 1 to 20 carbon atoms, such as 3,3,3-trifluoropropyl and chloromethyl. Thus, diorganopolysiloxane can be a homopolymer, a copolymer or a terpolymer containing such organic groups. Examples include homopolymers comprising dimethylsiloxy units, homopolymers comprising 3,3,3-trifluoropropylmethylsiloxy units, copolymers comprising dimethylsiloxy units and phenylmethylsiloxy units, copolymers comprising dimethylsiloxy units and 3,3,3-trifluoro propylmethylsiloxy units, copolymers of dimethylsiloxy units and diphenylsiloxy units and interpolymers of dimethylsiloxy units, diphenylsiloxy units and phenylmethylsiloxy units, among others. The silicon-bonded organic groups of the diorganopolysiloxane may also be selected from alkenyl groups having 1 to 20 carbon atoms, such as vinyl, allyl, butyl, pentyl, hexenyl, or dodecenyl. Examples include; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethyl siloxane-methylvinylsiloxane copolymers. The silicon-bonded organic groups of the diorganopolysiloxane may also be selected from various organofunctional groups such as amino, amido, mercapto, or epoxy functional groups.

Representative techniques for preparing such gums are well known in the art as exemplified by U.S. Pat. No. 6,013,682. For example, such a gum may be prepared by blending a composition containing at least one polysiloxane, at least one organosilicon material that reacts with said polysiloxane by a chain extension reaction and a metal containing catalyst for said chain extension reaction, at least one surfactant and water. The composition containing at least one polysiloxane, at least one organosilicon material that reacts with said polysiloxane by a chain extension reaction and a metal containing catalyst for said chain extension reaction are not critical and nearly any which cures by the chain extension reactions can be used herein. Such chain extension reactions generally involve (1) a polysiloxane which has an end group which reacts with the end group of another polysiloxane or (2) a polysiloxane having a reactive end group which is chain extended with a chain extension agent such as an silane. Alternatively, a small amount of the chain extension can occur at non-terminal sites on the polysiloxane. Chain extension reactions with polysiloxanes (polysiloxanes are also called silicones or organopolysiloxanes) are known in the art and can involve, for instance, the hydrosilylation reaction in which an Si—H reacts with an aliphatically unsaturated group in the presence of a platinum or rhodium containing catalyst. Alternatively, the reaction can involve the reaction of an Si—OH with an alkoxy group (e.g., alkoxysilanes, silicates or alkoxysiloxanes) in the presence of a metal containing catalyst. In a preferred embodiment, the subject silicone gums are prepared via hydrosilation reaction of a Si—H terminated polyorganosiloxane (e.g. Si—H terminated PDMS) and a vinyl terminated polyorganosiloxane (e.g. Si-vinyl terminated PDMS) using a Karstedt's Catalyst, preferably in water using optional surfactants.

Silicone Emulsion: The silicone emulsions of the present invention may be prepared by combining the aforementioned silicone gum with water and optional surfactants or solvents and mixing (typically under shear) the combination under appropriate conditions to form an emulsion. Representative methodologies are described in U.S. Pat. Nos. 6,013,682, 8,877,293 and US2015/0010711. This approach should be contrasted with ring opening emulsion polymerization approach described in U.S. Pat. No. 7,767,747. More specifically, this patent describes an emulsion including a blend of silicone and an organic polymer made by first forming an emulsion of a silicone polymer via ring opening emulsion polymerization followed by adding an ethylenically unsaturated organic monomer which is subject to free radical emulsion polymerization. The ring opening emulsion polymerization approach results in a silicone polymer having molecular weights much too low for "gum" applications. As described in U.S. Pat. No. 6,013,682, ring opening emulsion polymerization has a number of drawbacks. For instance, polymerization in the emulsion polymerization process occurs at the silicone water interface. As such, the rate of polymerization is faster with smaller particles because of the larger surface area and, thus, it is impossible to produce large particle size, high molecular weight silicone gum in water emulsions. Similarly, emulsion polymerization involves a number of processing steps and/or materials which are disadvantageous. For instance, ring opening emulsion polymerization requires long batch times and caustic materials (strong acidic or basic catalysts which must be neutralized). For example, the emulsion polymerization process described in U.S. Pat. No. 77,677,747 results in an emulsion having average polymer particle (i.e. "droplet") sizes of 0.03 to 0.5 microns. In contrast, the silicone emulsions of the current invention are formed by mechanical means, e.g. mixing polyorganosiloxanes under shear resulting in an average volume particle size (Dv 50) of from 1 to 10 microns and more preferably from 2 to 5 microns. While the silicone gum may be fully polymerized prior to emulsification via mechanical mixing, in a preferred embodiment, reactive polyorganosiloxane species are combined and subject to hydrosilylation (i.e. see above description regarding chain extension hydrosilylation reaction) while being subject to mechanical mixing.

Mixing can be accomplished by any method known in the art to effect mixing of high viscosity materials. The mixing may occur either as a batch, semi-continuous, or continuous process. Mixing may occur, for example using, batch mixing equipment with medium/low shear including change-can mixers, double-planetary mixers, conical-screw mixers, ribbon blenders, double-arm or sigma-blade mixers; batch equipment with high-shear and high-speed dispersers include those made by Charles Ross & Sons (NY), Hockmeyer Equipment Corp. (NJ); batch mixing equipment such as those sold under the tradename Speedmixer®; batch equipment with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, co-rotating extruders, such as those manufactured by Krupp Werner & Pfleiderer Corp (Ramsey, NJ), and Leistritz (NJ); twin-screw counter-rotating extruders, two-stage extruders, twin-rotor continuous mixers, dynamic or static mixers or combinations of these types of equipment.

Sufficient water is added to silicone gum form an emulsion. Typically 5 to 700 parts water are mixed for every 100 parts silicone gum to form an emulsion. In one embodiment the emulsion formed is a water continuous emulsion. The amount of water added can vary depending on the selection of the amount of silicone gum present and generally the amount of water is from 5 to 100 parts per 100 parts by weight of silicone gum. Typically the water is added to the mixture in incremental portions, wherein sufficient incremental portions of water are added to form an emulsion. Alternatively, a portion or all the water may be substituted with various hydrophilic solvents that are soluble with water such as low molecular weight alcohols, ethers, esters or glycols. Representative non-limiting examples include low molecular weight alcohols such as methanol, ethanol, propanol, isopropanol and the like; low molecular weight ethers such as di(propyleneglycol) mono methyl ether, di(ethyleneglycol) butyl ether, di(ethyleneglycol) methyl ether, di(propyleneglycol) butyl ether, di(propyleneglycol) methyl ether acetate, di(propyleneglycol) propyl ether, ethylene glycol phenyl ether, propylene glycol butyl ether, 1-methoxy-2-propanol, 1-methoxy-2-propyl acetate, propylene glycol propyl ether, 1-phenoxy-2-propanol, tri(propyleneglycol) methyl ether and tri(propyleneglycol) butyl ether, and other like glycols.

The emulsion products resulting from the present process may be an oil/water emulsion, a water/oil emulsion, a multiple phase or triple emulsion.

In one embodiment, the emulsion products produced by the present process are oil/water emulsions. The oil/water emulsion may be characterized by average volume particle of the dispersed silicone gum (oil) phase in a continuous aqueous phase. The particle size may be determined by laser diffraction of the emulsion. Suitable laser diffraction techniques are well known in the art. In the present description, particle size was determined using a Mastersizer 3000 with a Hydro SV attachment (Malvern Panalytical—a division of Spectris, Egham, Surrey, UK). Samples may be prepared by diluting to <1% in deionized water and then added dropwise to the Hydro SV attachment until the laser obscuration reaches nominally 5 to 8%. The particle (i.e. "droplet") size is obtained from a particle size distribution (PSD). The PSD can be determined on a volume, surface, length basis. The volume particle size is equal to the diameter of the sphere that has the same volume as a given particle. The term Dv represents the average volume particle size of the dispersed particles. Dv 50 is the particle size measured in volume corresponding to 50% of the cumulative particle population. In other words if Dv 50=10 µm, 50% of the particle have an average volume particle size below 10 µm and 50% of the particle have a volume average particle size above 10 µm. Dv 90 is the particle size measured in volume corresponding to 90% of the cumulative particle population. The average volume particle size (Dv 50) of the dispersed silicone gum particles in the oil/water emulsions is between 1 µm and 10 µm; or between 2 µm and 5 µm. The silicone gum content of the emulsion is not limited and preferably varies from 0.5 wt % to 95 wt %, alternatively from 20 wt % to 80 wt %, or alternatively from 40 wt % to 60 wt %.

Organic Polymer: The subject silicone gum emulsions additionally include a crosslinked organic polymer. Applicable organic polymers include those described in: U.S. Pat. No. 7,767,747, US2017/0247570 and WO2019/081277. Applicable organic polymers preferably include no silicon atoms and are derived from the polymerization (e.g. free-radical polymerization) of monoethylenically unsaturated organic monomers and multi-ethylenically unsaturated organic monomers that are imbibed within (i.e. migrate into) the aforementioned silicone gum particles. Such organic polymers include both homopolymers and copolymers. In the present patent application, a "monoethylenically unsaturated organic monomer" (preferably an α-monoethylenically unsaturated monomer) is a compound comprising a single polymerizable carbon-carbon double bond which under appropriate reaction conditions, is subject to free radical polymerization. Examples include monoethylenically unsaturated monocarboxylic acids, dicarboxylic acids and their corresponding esters. Representative "acrylates" include: methacrylates, substituted acrylates, substituted methacrylates, fluorinated acrylates, and fluorinated methacrylates. Specific examples include acrylate esters and methacrylate esters such as methyl acrylate, ethyl acrylate, butyl acrylate, t-butyl acrylate, 2-ethylhexyl acrylate, methyl methacrylate, decyl acrylate, lauryl acrylate, isodecyl methacrylate, lauryl methacrylate, and butyl methacrylate; substituted acrylates and methacrylates such as hydroxyethyl acrylate, perfluorooctyl acrylate, hydroxypropyl acrylate, hydroxypropyl methacrylate, and hydroxyethyl methacrylate. Representative "acrylic acids" include: acrylic acid, methacrylic acid, ethylacrylic acid and corresponding salts thereof. Representative "vinyl halides" include: vinyl chloride, vinylidene chloride, and chloroprene. Additional examples of applicable monomers include: maleic anhydride, vinyl esters such as vinyl acetate and vinyl butyrate; vinyl pyrrolidone; conjugated dienes such as butadiene and isoprene; vinyl aromatic compounds such as styrene and divinyl benzene; vinyl monomers such as ethylene; acrylonitrile and methacrylonitrile; acrylamide, methacrylamide, and N-methylol acrylamide; and vinyl esters of monocarboxylic acids with up to 10 carbon atoms. Preferred classes of monomers include: acrylates and acrylic acids and salts thereof.

In the present patent application, a "multi-ethylenically unsaturated organic monomer" is a compound comprising at least two polymerizable carbon-carbon double bonds which under appropriate reaction conditions, are subject to free radical polymerization. Applicable examples include: allyl methacrylate, diallyl phthalate, 1,4-butylene glycol dimethacrylate, 1,2-ethylene glycol dimethacrylate, 1,6-hexanediol diacrylate, and divinyl benzene.

In one class of embodiments, the organic polymer comprises a repeating unit represented by:

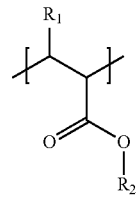

wherein $R_1$ and $R_2$ are independently selected from hydrogen and an alkyl group having from 1 to 6 carbon atoms. In a preferred subclass of embodiments, $R_1$ is selected from hydrogen or methyl and $R_2$ is selected from an alkyl group having from 1 to 4 carbon atoms, e.g. methyl, ethyl, propyl, butyl, t-butyl. In those embodiments where the subject organic polymer is a homopolymer, preferred classes include polyacrylates and polyacrylic acids along with its corresponding salts.

In the polymerization technique for preparing the crosslinked organic polymer, the mono and multi-ethylenically unsaturated organic monomers (collectively "organic monomers") may be added to the silicone gum emulsion in one or more additions which can be carried out continuously or linearly over the reaction period, or in combinations thereof. The organic monomers are soluble in the silicone gum and migrate through the aqueous phase and are imbibed into the silicone gum particles. Additional additives may optionally be added to the emulsion including initiators, moderators and surfactants (e.g. anionic or nonionic surfactants, polymerizable surfactants, etc.). For example, the organic monomer(s) may be introduced to a reactor including the silicone gum emulsion continuously over a period of several hours at a temperature of 70-95° C. A water-soluble free radical initiator such as t-butyl peroctoate or sodium persulfate may then added to the reactor in a separate stream over a period of several hours during addition of the organic monomer(s). Heating is then increased to activate the initiator, causing the organic monomer(s) to polymerize within the silicone emulsion particles. Thermal or redox initiation processes may be used in the preparation of the organic polymer phase. Conventional thermal free radical initiators which can be used include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. These initiators are typically used at a level of 0.01-3.0 wt % based on the total weight of monomer. Redox initiators which can be used are typically an oxidant plus a reducing agent in combinations effective to generate free radicals, including the same free radical initiators listed above as the oxidant; and a suitable reductant such as sodium sulfoxylate formaldehyde, ascorbic acid, isoascorbic acid, alkali metal and ammonium salts of sulfur-containing acids such as sodium sulfite, bisulfite, thiosulfate, hydrosulfite, sulfide, hydrosulfide or dithionite, formamidine sulfinic acid, hydroxymethane sulfonic acid, acetone bisulfite; amines such as ethanolamine, glycolic acid, glyoxylic acid hydrate, lactic acid, glyceric acid, malic acid, tartaric acid, as well as salts of the preceding acids which may be used. Redox reaction catalyzing metal salts of iron, copper, manganese, silver, platinum, vanadium, nickel, chromium, palladium, or cobalt, may optionally be used. The initiator or initiator system can be added in one or more additions, continuously, linearly, or not, over the reaction period, or as combinations thereof. Several azo-type organic free radical initiators which can be used in the monomer swell process such as azobis-isobutyronitrile and azobispropionitrile.

Additional additives may also be optionally included in the emulsion compositions, such as surfactants, preservatives, freeze/thaw additives and various thickeners. These additives, if present, along with water constitute the balance of the emulsion. In most embodiments, the subject emulsions will contain from 10 to 50 wt % solids, or more preferably from 15 to 25 wt % solids with the balance constituting water. One prepared, silicone gum preferably comprises from 90-99 wt % of the particles of the subject emulsion whereas the crosslinked organic polymer preferably comprises from 1-10 wt %.

Aqueous Coating Composition: Another embodiment of the present invention includes an aqueous coating composition comprising a dispersion of polyurethane including the aforementioned emulsion of silicone gum and crosslinked polyacrylate. Applicable polyurethanes include those made by conventional methods from one or more diisocyanate, e.g. isophorone diisocyanate or tetramethylene diisocyanate, or a polyisocyanate, and one or more polyol. Suitable polyols for making the polyurethane of the present invention can be any, such as a polyether polyol, polycarbonate polyol, or polyester polyol having a molecular weight (Mw) of 5,000 or less, or of 2,000 or less. Such polyols are preferably linear and have two hydroxyl groups, one at each end. It is preferable that the polyurethane comprise a polycarbonate polyol. Representative examples of applicable commercial polyurethane dispersion products include: BAYDERM™ and AQUDERM™ from Lanxess Corp., PERMUTEX™ from Stahl Polymer, HAUTHANE™ L-3121 from C. L. Hauthaway & Sons Corp. and PRIMAL™ BINDER available from The Dow Chemical Company. Applicable polyurethane dispersions can be prepared by methods conventional in the art. See for example the methods described in P. Pieterich, *Aqueous Emulsion, Dispersion and Solutions of Polyurethanes; Synthesis and Properties in Progress in Organic Coatings* 9 (1981) 281-340. See also: U.S. Pat. No. 7,232,859, US2004/0167252 and US2011/0112245. Such polyurethanes are commonly prepared by reacting an organic polyisocyanate(s) with an organic compound(s) containing isocyanate-reactive groups, particularly a polyol. The reaction may be carried out in the presence of a catalyst such as organic tin compounds and/or tertiary amines. The polyurethanes are made into aqueous dispersion by conventional means and may be anionic salt functional, non-ionic or anionic polyurethane dispersions. In one embodiment, the polyurethane dispersion may be an anionic polyurethane dispersion prepared by reacting one or more polyol with an organic compound having at least one acid group and at least two active hydrogen functionalities and a polyisocyanate. Suitable organic compounds having at least one acid group and at least two active hydrogen functionalities include, for example, 2,2-dimethyl olacetic acid and 2,2-dimethylolpropionic acid. Examples of acid groups suitable for the organic compound include, carboxylic acid, sulfonic acid, phosphoric, phosphonic acid and the like.

In one set of embodiments, the polyurethanes are selected from those having a weight average particle size (BI-90) of from 20 to 500 nm, preferably from 30 to 200 nm. As used herein, the phrase "weight average particle size," refers to the weight average particle size of a distribution of particles as determined by electrical impedance using a BI-90 Multisizer™ 3 Coulter Counter (Beckman Coulter, Inc., Fullerton, Calif.), per manufacturer's recommended procedures as of December 2019.

In another set of embodiments, the polyurethanes are selected from those having a weight average molecular weight (Mw) of 100,000 to 3,000,000 Daltons (AMU), or more preferably from 150,000 to 1,500,000 Daltons.

The aqueous compositions of the present invention may further include one or more optional additives such as: crosslinking agents, dullers, wetting agents, thickeners or rheology modifiers or their mixtures, curing agents, pigments or colorants, opacifiers and extenders, antioxidants and plasticizers. For example, the aqueous compositions may comprise from 0.5 to 20 wt. %, of one or more aqueous crosslinker, such as, for example, a polyisocyanate, polyaziridine, or aminoplast resin. Such crosslinking agents may be used in amounts of 0.1 wt. % or more, and up to 20 wt. %, for example, from 1 to 10 wt. %. Preferably, the crosslinker is water dispersible, and is an aliphatic polymeric isocyanate. By way of additional example, dullers are commonly included to reduce gloss via light scattering and surface roughening and may comprise known inorganic dullers, such as, for example, silica, fumed silica, alumina, silicates, (sub)carbonates, e.g. calcium carbonate, kaolin, phyllosilicates, talc, titania, zinc oxides, zirconium oxides, and alkali(ne) hydroxides having average diameters from submicron up to 30 μm; or may comprise organic dullers, such as, for example, 2-30 μm average diameter polytetrafluoroethylene, polyethylene, silicone, polyacrylic, polyurethane, urea-formaldehyde or polyvinylidene fluoride beads. The organic dullers may also fortify film strength. Useful proportions may include up to 100 wt. %, on a solids basis, of the total amount of duller component A) plus additional dullers. Examples of applicable commercial dullers include: fumed and precipitated silica, polymeric beads, (e.g. DOWSIL™ 23n additive), acrylics, (OPTIMATT™ AB Duller from the Dow Chemical Co.) and polyurethane (e.g. ADIMATT™ and SPHAERWET™ from Supercolori S.p.A.). By way of further example, wetting agents may comprise any surface active compound that improves flow or wetting of surfaces, such as, for example, fluorine or silicone containing surfactants, and anionic or nonionic surfactants. Suitable amounts of wetting agent solids may range up to 15 wt. %, preferably, up to 10 wt. %, based on the total solids weight of the aqueous composition. Examples of applicable commercial wetting agents include TRITON™ HW-1000, SURFYNOL™ 104, CAPSTONE™ FS-610, DOWSIL™ 67 Additive and DOWSIL™ 57 Additive. The subject aqueous coating compositions may also optionally include acrylic polymers such as those described in U.S. Pat. No. 9,200,404 and U.S. Ser. No. 10/100,377.

To form the aqueous coating compositions of the present invention, the materials may simply be mixed together using a laboratory stirrer and added dropwise under gentle agitation. In one set of embodiments, the aqueous coating composition comprises from 15 to 99 wt %, more preferably from 20 to 60 wt % and still more preferably from 30 to 40 wt % of polyurethane; and from 0.5 to 10 wt % and more preferably from 1 to 5 wt % of the subject interpenetrating network of silicone gum and crosslinked organic polymer. The remainder of the coating composition comprises water along with other optional constituents such as surfactants, biocides, etc. For example, the composition may comprise from 40 to 80 wt. % of water, based on the total weight of the composition. In addition, water for dilution may be added, such as, for example, for use at remote site to reduce the total solids of the compositions to a desired range. Accordingly, aqueous compositions may be shipped in any stable concentrated form, such as, for example, aqueous compositions comprising additional materials, e.g. surfactants, wetting agents, etc.

In some embodiments, the aqueous coating composition comprises substantially no solvent (e.g. isopropyl alcohol, glycol ethers, etc.), e.g. less than 10 wt %, less than 1.0 wt %, less than 0.1 wt % or even 0.0 wt %).

In another aspect of the present invention, the methods of using the aqueous compositions comprise forming the aqueous composition, applying the coating composition to one or more substrate, drying, and preferably curing (e.g. at elevated temperature) the coating composition. Drying may be performed in a known manner such as, for example, air drying or heat drying at temperatures that will not damage the substrate. The aqueous compositions may be applied to unfinished or basecoat finished leather, by any suitable means including conventional coatings application methods such as curtain coating, brush coating, roll coating, and spraying methods such as air-atomized spray, air-assisted spray, airless spray, high volume low pressure spray, and air-assisted airless spray. Typical application rates of the aqueous leather treatment composition are in the range of 2.0 to 100 grams dry weight per square meter (g/m2). The coating composition applied to a substrate is generally dried, or allowed to dry, at a temperature range of 20 to 100° C. and more preferably from 85 to 100° C. to provide a coated leather substrate having a dried coating of the aqueous leather coating composition on at least one surface of the leather substrate. The drying and curing method can vary depending on, for example, the specific components of the coating composition, the coating amount, and the type of leather. Examples of the drying and curing method include air drying at room temperature, hot air drying at for example 85° C., and infrared heating.

The aqueous coating composition can be applied directly onto a leather substrate or indirectly coated over a primer layer. Coatings made from the aqueous compositions of the present invention may include basecoats, color coats and topcoats comprising any of clear-coats, stains or translucent coatings, pigmented color coats.

The aqueous leather coating composition can be applied to leather or a leather-like substrate such as, for example, natural leather, artificial leather, synthetic leather and vinyl leather. Examples of leather-like substrates include polyurethanes, polyvinyl chlorides, polyolefins, and polyamides. Likewise, the coating composition can be applied to natural skin that originated from, for example a cow, a sheep, a goat, a pig, a horse, a kangaroo, a deer, an alligator, or a snake. The coating composition can be applied to leather such as mineral-tanned or vegetable-tanned leather including full-grain leather, buffed or corrected-grain leather, and split leather, with or without a prior treatment with an impregnating resin mixture and with or without the application of subsequent coatings. The leather can receive a smooth or hair cell embossing prior to coating with the aqueous leather treatment composition to provide a flat surface for coating or to reduce the porosity of buffed or split leather.

As used herein unless otherwise indicated, the term "weight average molecular weight" or "Mw" refers to the weight average molecular weight of a polymer as measured by gel permeation chromatography (GPC).

As used herein unless otherwise indicated, the term "viscosity" refers to dynamic viscosity as determined using an ARES rheometer. This methodology is based upon a well-established parallel plate model and is conventionally used in the art for high molecular weight silicones, see for example EP1536765. For additional background on this technique, see: J. F. Swindells, R. Ullman, H. Mark, "*Determination of Viscosity,*" in Technique of Organic Chemistry (Physical Methods of Organic Chemistry), vol. I, part 1, ed. by A. Weissberger, Interscience Publ., New York, (1959) and *Fluid Mechanics for Chemical Engineers* by James O. Wilkes, Prentice-Hall, New Jersey, (1999). In particular, viscosity is measured as follows: In a 50 milliliter plastic centrifuge tube, first add 30 milliliters of acetone followed by 5 grams of the sample emulsion. Cap and shake the tube for 60 seconds or until the emulsion is broken (i.e. absence of white areas). Centrifuge the tube for 5 minutes at approximately 3000 RPM. Pour off the acetone. Use a spatula to remove the polymer from the tube and place on an aluminum weigh tin. Drive off the solvent in a vented oven at 50° C. for 12 hours. Remove the material from the oven and allow cooling to room temperature before measuring. Dynamic viscosity of the harvested polymer is measured on an ARES rheometer (commercially available from TA Instruments Corp) operating under the following conditions: 25 mm parallel plates, 1.0 mm gap, 10% strain and an oscillation frequency of 0.01 Hz. Measurements were taken at 25° C. at a shear rate of $0.01\ s^{-1}$.

Many embodiments of the invention have been described and, in some instances, certain embodiments, selections, ranges, constituents, or other features have been characterized as being "preferred." Such designations of "preferred"

features should in no way be interpreted as an essential or critical aspect of the invention. Expressed ranges specifically include designated end points.

EXAMPLES

A series of aqueous silicone-containing emulsions (i.e. silicone emulsions A-G) were prepared and subsequently combined with a commercial aqueous polyurethane dispersion used in leather treatment, (i.e. PERMUTEX™ RU 13-085 from Stahl Polymer (an aliphatic water based polyurethane dispersion of 30% solid content and pH of 9) to prepare a corresponding series of aqueous coating compositions (Sample Coating Compositions A-G). The Sample Coating Compositions were then subjected to compatibility testing as described below. Unless otherwise indicated, all units of temperature are room temperature (RT) and all units of pressure are standard pressure (1 atm or 760 mm Hg. The following materials were used in the preparation of the silicone emulsions. The individual constituents used to prepare the sample silicone gum emulsions are specified in the following table:

| Commercial Name | Functional Description | Chemical Description | Source |
|---|---|---|---|
| Poly step ™ A-16-22 | Surfactant | Sodium dodecyl benzene sulfonate (22% active) | Stepan |
| 4-Hydroxy TEMPO ™ | Radical moderator | 4-hydroxy-2,2,6,6-tetramethylpiperidin-1-oxyl | Sigma Aldrich |
| Sipomer ™ PAM 600 | Reactive surfactant | organic phosphate | Solvay |
| Luperox ™ 26 | Acrylic initiator | t-butyl peroctoate | Arkema |
| N/A | Acrylic monomer | t-butyl acrylate (t-BA) | Sigma Aldrich |
| N/A | Acrylic monomer | Butyl acrylate (BA) | Sigma Aldrich |
| N/A | Acrylic crosslinker | Allyl methacrylate (ALMA) | Sigma Aldrich |
| Dowsil ™ SFD 128 | Vinyl term. silicone | $MViD_{920}MVi$ | Dow Chemical |
| Xiameter ™ OFX 5057S | Si—H term. silicone | $M'D_{1655}M'$ | Dow Chemical |
| N/A | Karstedt's Catalyst | Pt-complexed w/tetramethyl divinyldisiloxane | |

The quantities and identity of the specific polymeric and monomeric constituents of each silicone emulsion A-G are specified in the following table:

| Polymer & monomer constituents | Silicone Emulsions A-G: (wt %) | | | | | | |
|---|---|---|---|---|---|---|---|
| | A | B | C | D | E | F | G |
| Silicone gum (PDMS) emulsion | 90 | 90 | 95 | 100 | 90 | 95 | 90 |
| t-BA | 0 | 9.6 | 0 | 0 | 0 | 0 | 10 |
| BA | 9.6 | 0 | 4.8 | 0 | 10 | 5 | 0 |
| ALMA (crosslinker) | 0.4 | 0.4 | 0.2 | 0 | 0 | 0 | 0 |
| Total acrylic content (wt %) | 10 | 10 | 5 | 0 | 10 | 5 | 10 |
| Total silicone content (wt %) | 90 | 90 | 95 | 100 | 90 | 95 | 90 |

In summary, Silicone Emulsions A, B and C comprise aqueous emulsions including an interpenetrating polymer network of a silicone gum (polydimethylsiloxane, (PDMS)) and crosslinked polyacrylate, whereas Silicone Emulsions E, F and G comprise a similar emulsion using a non-crosslinked polyacrylate. Silicone Emulsion D was a control sample comprising an aqueous emulsion of a silicone gum with no polyacrylate.

The following method was used to prepare Silicone Emulsion D which in turn was used to prepare Silicone Emulsions A, B, C, E, F and G. A silicone seed emulsion was prepared using a dental mixer (a Flaktek™ SpeedMixer DAC 600 FVZ, FlackTek Inc., Landrum, SC) as follows. The above specified Si—H terminated PDMS fluid and a vinyl terminated PDMS fluid were added to a 300 g max dental mixer cup and spun at maximum speed (2350 RPM) for 30 seconds. These fluids were combined in a nearly stoichiometric ratio of Si—H to Si-vinyl groups with a slight excess of vinyl groups (1.023:1 ratio of vinyl to Si—H). Next, Polystep™ A-16-22 (surfactant) and any initial water if needed to achieve the target particle size beyond the water provided with the surfactant were added to the cup. This combination was mixed for two minutes at maximum speed with the sides being scraped after the first minute with a spatula. A thick emulsion was formed. Dilution water was then added in increments, each followed by spin for 30 seconds to reach the final desired solid content of approximately 60 wt. %. A solution of platinum catalyst was then added to the emulsion and the content was mixed for 30 seconds at maximum speed. The emulsion was then left overnight at room temperature to allow for the hydrosilylation reaction to proceed. The resulting emulsions had an average volume particle size (Dv 50) between 2.5 and 4.5 µm and an internal phase molecular weight (Mw) of approximately 500,000 Daltons.

Sample Emulsions A, B, C, E, F and G were prepared according to the following procedure. First, the silicone "seed" emulsion described (i.e. Silicone Emulsion D) above along with any additional water necessary to obtain approximately 18 wt. % solids content were added to a three-neck flask. To one neck a condenser was fitted with a thermocouple through an elbow joint, to the middle neck a stir rod with a Teflon paddle connected to a Caframo™ mixer (Caframo Limited, Georgian Bluffs, Ontario, Canada), and to the third neck a gas inlet port for nitrogen sweep. The outlet for the nitrogen sweep was on top of the condenser which led to a gas bubbler. The set-up was clamped onto the rack in the hood and the nitrogen flow was checked to ensure that there were no leaks. The flask was then placed into a heating mantle. Next, a monomer emulsion was prepared in a glass vial. Acrylic monomers totalling 43.3 wt. % of the monomer emulsion were added (see Table above) to the vial along with 2.6 wt. % Polystep™ A-16-22, 7.5 wt. % PAM-600, 0.78 wt. % of a 5 wt. % solution of 4-Hydroxy TEMPO™, and the balance water. This mixture was emulsified using a Vortex Mixer (Scientific Industries, Inc. Bohemia, NY). The monomer emulsion was added to the reactor and rinsed into the reactor with additional water. Then, the nitrogen sweep was started and the reaction content was heated to 70° C. At this point (including heating time) 60 min was given for the acrylic monomer to swell into the silicone seed. Once the "swell time" was over, an initiator emulsion was prepared. First, a mixture containing 78 wt. % Luperox™ 26.7 wt. % water, 10 wt. % Polystep™ A-16-22, and 5 wt. % of a 5 wt. % solution of 4-Hydroxy TEMPO™ was emulsified on a vortex mixer. Then, additional water was added to bring the final Luperox™ 26 level in the initiator emulsion to 45.1 wt. %. The $N_2$ sweep on the reactor was stopped, the initiator emulsion was added, and the sweep was reinitiated. The reaction was held at approx. 70° C. for one hour then the temperature was raised to 85° C. for an additional hour. After that, the temperature was raised to 92° C. for one hour to consume the residual monomer before the reaction was quenched with an ice water bath. The final emulsion was filtered using a Whatman #8 filter.

Sample aqueous coating compositions (Samples A-G) were prepared by mixing each corresponding silicone emulsion (Silicone Emulsions A-G) with PUD using a high speed mixer for 30 seconds at 2700 rpm to achieve 2.5 wt % active silicone in the coating composition, (i.e. 2.78 g of silicone emulsions A, B, C, E, F and G were each independently mixed with 20 g of PUD to prepare corresponding Sample Coating Compositions A, B, C, E, F and G and 0.83 g of silicone emulsion D was mixed with 20 g of PUD to prepare Sample Coating Composition D.

The compatibility of each Sample Coating Composition (A-G) was visually determined by coating each Sample using a 60μ cylindrical film applicator from BYK upon a sheet of a sealed opacity chart (form 2A obtained from Leneta Company). The top of the chart is black and the bottom was white with an overall dimensions of 5½×10 in (140×254 mm). The coated chart was then dried in a conventional oven for 2 minutes at 80° C. The continuous film generated by the coating formulation was visually observed on a Leneta chart after fully drying by an observer from a distance of approximatively 50 cm and a viewing angle of 45°. The following rating scale was used to characterize each sample coating. The results of the compatibility testing are provided in the table below.

1—film is uniform, transparent and without visible defects.
2—film is hazy with local opacity or whitening but no pinholes are visible.
3—film has pinholes of an average size below 1 mm diameter.

| Sample Coating Composition | Visual observation on Leneta chart |
|---|---|
| D (Control) | 3 |
| E (Comparative) | 3 |
| F (Comparative) | 3 |
| G (Comparative) | 3 |
| A | 2 |
| B | 1 |
| C | 1 |

The invention claimed is:

1. An aqueous emulsion comprising particles having an Dv50 average volume particle size of 1 to 10 μm, wherein said particles comprise an interpenetrating polymer network comprising: from 90 to 99 wt % of silicone gum and from 1 to 10 wt % of a crosslinked organic polymer;
   wherein the silicone gum is a linear polyorganosiloxane substantially free of trifunctional and tetrafunctional units and is characterized by having:
   a William's plasticity number of at least 30 as determined by ASTM D926-17,
   a viscosity at least 20,000,000 cP at 25° C., and
   a weight average molecular weight (Mw) of from 400,000 to 1,000,000 Daltons.

2. The emulsion of claim 1 wherein the organic polymer comprises no silicon atoms.

3. The emulsion of claim 1 wherein the organic polymer is derived from polymerization of monoethylenically unsaturated organic monomers and multi-ethylenically unsaturated organic monomers.

4. The emulsion of claim 3 wherein the organic polymer is derived from polymerization of: i) monoethylenically unsaturated organic monomers selected from at least one of: acrylates and acrylic acid and salts thereof, and ii) multi-ethylenically unsaturated organic monomers selected from at least one of: allyl methacrylate, diallyl phthalate, 1,4-butylene glycol dimethacrylate, 1,2-ethylene glycol dimethacrylate, 1,6-hexanediol diacrylate, and divinyl benzene.

5. The emulsion of claim 1 wherein the organic polymer comprises a repeating unit represented by:

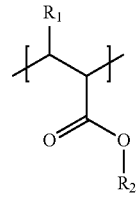

wherein $R_1$ and $R_2$ are independently selected from hydrogen and an alkyl group having from 1 to 6 carbon atoms.

6. The emulsion of claim 1 wherein the organic polymer a polyacrylate, or a polyacrylic acid or a corresponding salt thereof.

* * * * *